United States Patent [19]
Priceman

[11] Patent Number: 4,889,776
[45] Date of Patent: Dec. 26, 1989

[54] REFRACTORY METAL COMPOSITE COATED ARTICLE

[75] Inventor: Seymour Priceman, Seaford, N.Y.

[73] Assignee: Barson Corporation, Troy, Mich.

[21] Appl. No.: 86,023

[22] Filed: Aug. 17, 1987

[51] Int. Cl.$^4$ .............................................. B32B 15/04
[52] U.S. Cl. .................... 428/629; 428/662; 428/660
[58] Field of Search .............. 428/629, 641, 660–665; 416/241 B

[56] References Cited

U.S. PATENT DOCUMENTS

| | | | |
|---|---|---|---|
| 2,777,254 | 1/1957 | Siefert et al. | 427/419.1 |
| 2,902,392 | 9/1959 | Fitzer | 428/632 |
| 3,540,863 | 11/1970 | Priceman et al. | 29/191.2 |
| 3,657,784 | 4/1972 | Selman et al. | 428/632 |
| 3,783,013 | 1/1974 | Seeman | 427/318 |
| 3,853,524 | 12/1974 | Schwenninger | 65/374.11 |
| 4,017,674 | 4/1977 | Chapman | 373/124 |
| 4,095,003 | 6/1978 | Weatherly et al. | 428/632 |
| 4,208,453 | 6/1980 | Baldi | 428/632 |
| 4,248,940 | 2/1981 | Goward et al. | 428/633 |
| 4,263,058 | 4/1981 | Brown et al. | 148/6 |
| 4,280,975 | 7/1981 | Ammann | 264/81 |
| 4,321,310 | 3/1982 | Ulion et al. | 428/612 |
| 4,326,011 | 4/1982 | Goebel et al. | 428/641 |
| 4,366,571 | 12/1982 | Palmquist | 373/30 |
| 4,411,936 | 10/1983 | Schrewelins | 427/367 |
| 4,588,607 | 5/1986 | Matarese | 427/34 |
| 4,595,637 | 6/1986 | Eaton et al. | 428/608 |
| 4,668,262 | 5/1987 | Kithany | 428/664 |

OTHER PUBLICATIONS

"Reliable, Practical Protective Coatings for Refractory Metals Formed by the Fusion of Silicon Alloy Slurries", S. Priceman et al, *Electrochemical Technology*, vol. 6, No. 9-10, Sep.-Oct. 1968, pp. 315-326.

*Primary Examiner*—L. Dewayne Rutledge
*Assistant Examiner*—George Wyszomierski
*Attorney, Agent, or Firm*—Reising, Ethington, Barnard, Perry & Milton

[57] ABSTRACT

The coated article includes a refractory metal substrate having an oxidation resistant intermetallic layer formed in situ thereon; e.g., a fused refractory metal silicide layer, and a ceramic layer applied on and adhering to the intermetallic layer to provide enhanced high temperature properties and improved resistance to premature catastrophic failure in high temperature oxidizing environments where dissimilar materials are present that may destructively react with the intermetallic layer.

4 Claims, 1 Drawing Sheet

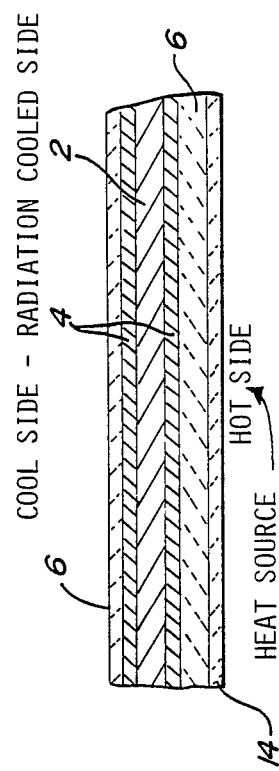
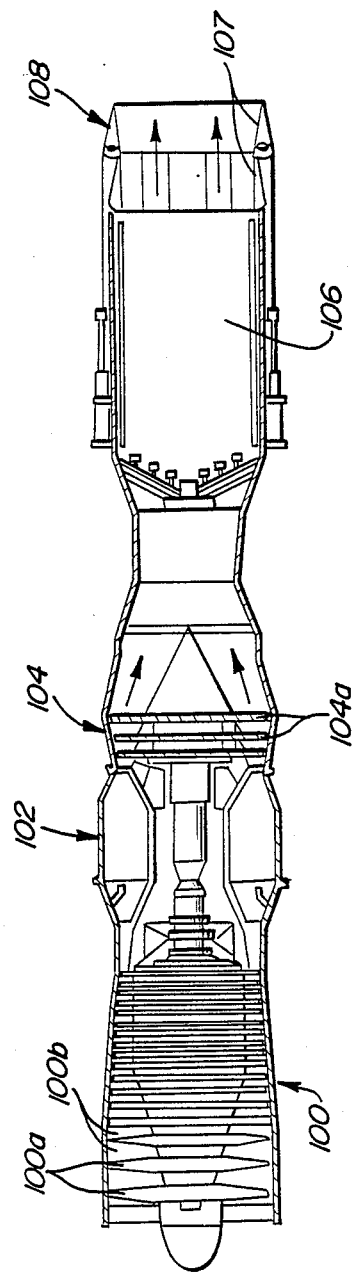
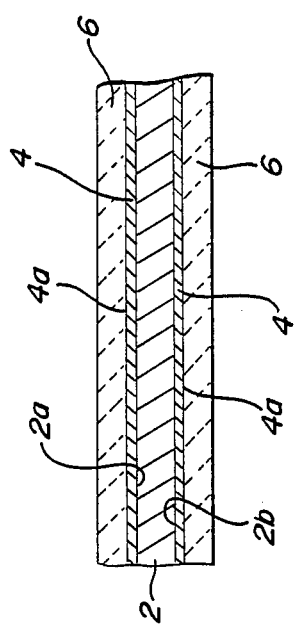

REFRACTORY METAL COMPOSITE COATED ARTICLE

FIELD OF THE INVENTION

The invention relates to coated refractory metal articles and methods for their manufacture and, in particular, to coated refractory metal articles having improved operating temperature and life capabilities as well as improved resistance to premature catastrophic failure in high temperature oxidizing environments.

BACKGROUND OF THE INVENTION

The very high melting points and consequent high temperature strength of the so called refractory metals, including but not limited to columbium, molybdenum, tantalum, rhenium and tungsten, have made them logical candidates for applications in high temperature environments. However, the unacceptably poor oxidation resistance of all of these metals or alloys thereof has in the past, limited their use to applications only in non-oxidizing environments (inert gas or vacuum atmospheres for all, reducing atmospheres for some).

A substantial number of programs, during the period from 1954-1970, aimed at the development of oxidation resisting coatings for the refractory metals, yielded some positive results, the most notable of which are covered by U.S. Pat. No. 3,540,863 issued Nov. 17, 1970, to Seymour Priceman and Lawrence Sama. The fused silicide coating is formed by applying a dried slurry of powdered silicon alloy on the substrate, then heating to a temperature and for a time to melt the alloy and react it with the substrate to form refractory metal silicides and finally cooling to ambient temperature. The fused refractory metal silicide coatings covered by this patent have been widely accepted and have proven successful in real service applications over the intervening years. The principal real service applications have been for liners in the afterburner nozzles of gas turbine engines (e.g., the Pratt & Whitney Aircraft F-100 engine) and for thrust chambers, thrust chamber-nozzle assemblies, and nozzle extensions for liquid rocket motors. In these applications the design wall temperatures of the component may range from 2200° F. to 3000° F., which is beyond the capability of conventional metals.

Use of fused silicide coated refractory metals in gas turbine engines places burdens on the silicide coating in addition to oxidation degradation. In particular, gas turbine engines currently employ a wide variety of metals, including aluminum, titanium, steels and of course nickel, cobalt and iron based superalloys in various engine components upstream of the fused silicide coated refractory metal hot section component. In addition a very large variety of materials are also used as coatings for wear, corrosion and erosion resistance and as abradable seals upstream of the coated refractory metal hot section component. Therefore, there is potential for many of these other materials to accidentally or inadvertently come in contact with the coated refractory metal component during any reasonable period of operation. Since the refractory metal component may be operating at 2200°-3000° F. and since the principal constituent of the protective oxidation resistant coating is silicon, contact of any of the above materials or oxide scales thereof with the refractory silicide coating can result in serious damage to the coating due to chemical or metallurgical reaction therewith and damage to the refractory metal substrate as a result of loss of coating protectiveness. If the metals or coating constituents of the upstream components come in contact with a silicide coated refractory metal at a surface temperature greater than 2000° F. for a sufficient time, the metal may alloy or react with the silicide coating and result in either eutectic formation and/or localized melting of the coating, or at the very least, localized degradation of the coating which may then fail prematurely.

Degradation from oxidation and chemical/metallurgical reactions of dissimilar materials with the silicide coating will increase as engine manufacturers attempt to increase the temperature of the hot gas flow in gas turbine engines to enhance engine thrust and/or engine efficiency.

SUMMARY OF THE INVENTION

The invention contemplates a coated refractory metal substrate or article having improved operating temperature and life capabilities at temperature and, where necessary, improved resistance to premature catastrophic failure resulting from chemical/metallurgical reactions with other materials in a high temperature oxidizing environment.

The invention also contemplates a coated refractory metal substrate or article having such improved capabilities by virtue of the presence of a special coating on the refractory metal.

The invention further contemplates methods for applying the special protective coating to a refractory metal substrate or shaped article using modified coating application parameters and/or treatments of the substrate or coated article to impart the improved operational capabilities to the coating.

The invention further contemplates a gas turbine or other engine using hot gas flow in which a downstream coated refractory metal hot section component is protected from degradation or destruction as a result of reaction with materials, such as dissimilar metals or compounds thereof, from upstream components and coatings in the engine.

The invention provides a refractory metal substrate or article having an inner oxidation resistant intermetallic layer thereon formed in situ on the substrate by reaction of another metal with the substrate to include an oxidation resistant intermetallic compound of the refractory metal, preferably a fused silicide of the refractory metal, and an outer ceramic layer adhering to the inner layer. The ceramic layer is selected to exhibit stability in high temperature oxidizing environments, chemical/metallurgical stability at the interface with the intermetallic layer in such high temperature environments, adequate adherency to the intermetallic layer and, where necessary, reaction barrier characteristics for preventing chemical/metallurgical reaction between the intermetallic layer and reactive materials, such as metals, that could degrade or destroy the intermetallic layer and/or refractory metal substrate by alloying or reacting therewith and/or thermal barrier characteristics. Furthermore, the ceramic layer can be selected to have radiation emissivity and reflection properties to suit particular high temperature operating environments to aid in protecting the coated article. Additional ceramic layers may be applied to the outer ceramic layer to this end.

Application of the ceramic outer layer onto the intermetallic inner layer is effected by plasma spraying or other deposition techniques such as chemical vapor deposition. According to method aspects of the invention, the adherence of the ceramic layer to the intermetallic layer is enhanced by imparting increased surface roughness to the intermetallic layer. In one method aspect of the invention, the refractory metal substrate is treated such as by grit blasting or other physical or chemical techniques to increase substrate surface roughness which is imparted, in turn, to the free surface of the intermetallic layer formed in situ on the substrate.

In another method aspect of the invention, the heating parameters at which the intermetallic layer is formed in situ on the substrate are modified to increase the surface roughness of the layer by shortening the time the coating layer has to "wetout" or smooth out in the molten state on the substrate.

Still another method aspect of the invention involves increasing the surface roughness of the intermetallic layer by substantially increasing its thickness since surface roughness has been observed to increase with coating thickness.

In these method aspects of the invention, surface roughness of the intermetallic layer is maintained preferably within the range of about 160 to about 300 micro-inches RMS, and more preferably within the range of about 200 to about 300 micro-inches RMS.

Another method aspect of the invention involves exposing the refractory metal substrate having the intermetallic inner layer and ceramic outer layer thereon to a high temperature oxidizing treatment to oxidize a constituent, such as silicon, of the intermetallic layer through the oxygen permeable ceramic layer to form an oxidation scale, such as silica, that grows into crevices, pores and interstices of the ceramic layer at their interface to enhance the bond therebetween.

BRIEF DESCRIPTION OF THE DRAWINGS

FIG. 1 is a partial cross-section through a refractory metal composite or coated article of the invention.

FIG. 2 is a schematic illustration of a gas turbine engine including the refractory metal composite component or article of the invention.

FIG. 3 is a partial cross-section through a refractory metal composite or coated article of the invention having a multiplex coating thereon.

BEST MODE FOR PRACTICING THE INVENTION

The invention provides a refractory metal composite article that includes a refractory metal substrate 2, an oxidation resistant intermetallic layer 4 on the substrate and a ceramic layer 6 adhering on the intermetallic layer 4, FIG. 1.

In FIG. 1, opposite surfaces 2a,2b of the substrate are shown having the intermetallic layer 4, and ceramic layer 6 thereon. Of course, the invention envisions and includes a refractory metal substrate having the layers 4,6 on only one side or on only a portion of surfaces 2a,2b as required for the particular use involved.

Typically, the refractory metal substrate 2 is fabricated such as by machining, spinning, forming, welding and other known forming techniques to a final shape adapted for use in a particular service application prior to application of layers 4,6 thereon, although the invention is not to be construed as so limited.

As used herein including the claims, the term refractory metal shall generally include Rows 5 and 6 of the Group IV-VII metals of the Periodic Table of Elements (Zr,Nb,Mo,Tc,Hf,Ta,W,Re) as well as alloys thereof one with another and/or with other non-refractory elements. Columbium, molybdenum, tantalum, rhenium and tungsten as well as alloys thereof one with another and/or with other nonrefractory elements where the refractory metal comprises at least about 50 percent by weight of total alloy weight are preferred refractory metals to which the invention is especially applicable.

Columbium and alloys of columbium are expected to be the most widely used substrate materials with respect to service applications in gas turbine engines and rocket motors where high temperature gas flow is employed as a propulsion medium. Suitable columbium alloys, useful in this invention are set forth in aforementioned Priceman and Sama U.S. Pat. No. 3,540,863, the teachings of which are incorporated herein by reference. Of course, the invention is not limited to use with columbium or its alloys.

In one embodiment of the invention especially preferred for use with columbium alloy substrates, the intermetallic layer 4 is a silicide layer of the type described in the aforementioned U.S. Pat. No. 3,540,863, and formed by the slurry and fusing techniques described in that patent, the teachings of which are incorporated herein by reference.

Although silicide layers of the refractory substrate metal are preferred, other oxidation resistant intermetallic layers formed in situ on the substrate by reaction of another metal therewith are possible; e.g., refractory metal aluminides, beryllides and others are considered within the scope of the invention.

In forming the silicide layer 4, a slurry of powdered silicon-bearing alloy is applied to surface 2a and/or 2b of the refractory metal substrate 2 and then the coated substrate is heated to a temperature and for a time sufficient to melt the powdered metal into a molten layer that wets and reacts in situ with the substrate to form oxidation resistant intermetallic layer 4. The coated substrate is then cooled to ambient temperature. A preferred powdered metal composition for use in the slurry nominally includes by weight 60% silicon, 20% chromium and 20% iron. When the slurry includes such powdered silicon alloy applied onto a columbium alloy substrate, heating of the coated substrate is at a temperature and time sufficient to melt the powdered silicon alloy and cause it to wet and react with the columbium alloy substrate in situ thereon to form a fused layer of oxidation resistant columbium silicides in various stoichiometric ratios of columbium to silicon through substantially the entire thickness of layer 4 as explained in the aforementioned U.S. Pat. No. 3,540,863 and a technical article entitled "Reliable, Practical, Protective Coatings for Refractory Metals Formed By The Fusion Of Silicon Alloy Slurries" published in *Electrochemical Technology*, Vol. 6, No. 9–10, Sept.–Oct 1968 authored by Priceman and Sama, the teachings of which technical article are also incorporated herein by reference.

As will be explained hereinbelow, a method aspect of the invention involves controlling the surface roughness of the outer surface 4a of the silicide layer to promote adherence of the ceramic layer to be applied thereto. In particular, the surface roughness of the silicide layer is increased compared to that normally obtained by the fusing heat treatment. As will be explained, this involves, in one case, modifying the heating parameters during the fusing treatment and, in other cases, pretreating the refractory metal substrate to increase surface roughness of the fused silicide layer 4 or post treating the ceramic coated metal article.

In accordance with the invention, the fused silicide layer 4 is covered or coated with a refractory ceramic layer 6 shown in FIG. 1. The ceramic layer preferably is applied to surface 4a of the silicide layer by air plasma spraying; however, other suitable techniques for depositing ceramics, such as chemical vapor deposition, could also be used to apply the desired ceramic layer 6.

Requirements for the ceramic overly layer 6 include stability in high temperature oxidizing environments; i.e., the ceramic should not oxidize or otherwise react with the environment to any significant adverse extent. Some ceramics may oxidize at elevated temperature but the oxidizing is self-limited and eventually reaches an acceptable minimal level. As will be explained hereinbelow, the environment may include dissimilar metals that may deposit on or contact the ceramic layer. The ceramic layer should be stable in such situations: i.e., substantially non-reactive with such metals and oxides and other compounds thereof, at the temperatures encountered in use. Substantial non-reactivity with the environment is desired. The ceramic should also exhibit stability in contact with the silicide layer at their interface in such high temperature oxidizing environments so that the oxidation resistant properties of the silicide layer are not significantly adversely altered or affected. Generally, the ceramic layer and silicide layer should be compatible in such environments so that one layer does not significantly adversely affect the desired performance of the other in the environment.

The ceramic layer and silicide layer must exhibit sufficient adherency therebetween through all conditions of us to be encountered in the high temperature oxidizing environments including expected thermal cycling between high and low temperatures.

In some service applications the ceramic layer 6 should also exhibit thermal barrier characteristics so as to reduce the temperature of the intermetallic layer and refractory metal substrate. Also in some service applications the ceramic layer should exhibit resistance to wear and abrasion to such an extent that it is not removed or worn away during the expected or desired time of service.

Ceramic materials which may be of use as ceramic layer 6 in practicing the invention include alumina ($Al_2O_3$), hafnia ($HfO_2$), ceria ($CeO_2$), magnesia (MgO), calcia stabilized zirconia ($ZrO_2-8w/o$ $CaCO_3$), yttria stabilized zirconia ($ZrO_2-8-20$ w/o $Y_2O_3$), yttria ($Y_2O_3$), magnesium zirconate ($ZrO_2-24$ w/o MgO), magnesium aluminate ($MgO-Al_2O_3$), calcium zirconate ($ZrO_2-31$ w/o CaO), and zirconium silicate ($ZrO_2-SiO_2$).

Preferred ceramics among those listed include alumina, ceria, yttria-stabilized zirconia and yttria by virtue of their having passed a three part screening test. The first screening test consisted of subjecting ceramic coated columbium alloy specimens having similar silicide layer between the ceramic layer and columbium alloy substrate to nine cycles of a slow cyclic oxidation test in which the cycle is 40 minutes in duration an the temperature is varied in sine wave fashion from 800° F. to 2300° F. and back to 800° F. The ceramic coated specimens that satisfactorily completed th nine cycles were further tested for additional fifty-six cycles in the same test. The additional cycles constitute the second screening test. The third screening test consists of exposing columbium alloy specimens having the silicide layer and ceramic layer thereon at 2500° F. in air with four cycles to room or ambient temperature. These screening tests can be used to select suitable ceramics for use in applications involving high temperature oxidizing environments where thermal cycling is required. Of course, the screening tests can be tailored to different types of service applications expected to be encountered. And, the screening tests referred to above may be supplemented by additional tests which are unique and tailored to the expected environment to evaluate other factors of performance; e.g., to evaluate which ceramic exhibits maximum operating temperature.

The preferred thickness for the ceramic layer will depend o its intended function or functions in a particular operating environment. Preferably, the ceramic layer is applied in a thickness range of about 5 mils to about 40 mils when the ceramic layer functions primarily as a thermal barrier coating to reduce the temperature of the intermetallic layer and refractory substrate. When the ceramic layer constitutes primarily a chemical/metallurgical barrier, a thickness range of about 3 mils to about 6 mils is preferred. If wear and/or erosion resistance is the primary intended function, the ceramic layer will have a thickness range of about 3 mils to about 10 mils. To alter emissive properties of the silicide coated substrate, the ceramic layer may be only about ½ mil to about 3 mils in thickness. Of course, the ceramic layer may serve multiple functions and the layer thickness is selected accordingly.

As mentioned hereinabove, the surface roughness of the fused silicide layer 4 is controlled; i.e., increased, to promote adherence of the plasma sprayed ceramic layer thereto. Silicide coatings fused on columbium alloys by past techniques exhibit a natural micro roughness on surface 4a of approximately 100-140 micro-inches RMS (root mean square). According to the invention, the bond strength or adherence of the ceramic layer 6 to the silicide layer 4 is increased by providing a rougher surface 4a on the silicide layer. Preferably, the surface roughness of the silicide layer is within the range of about 160 to about 300 micro-inches RMS and, even more preferably, within about 200 to 300 micro-inches RMS.

In accordance with the invention, surface roughness within the preferred ranges for the silicide layer can be obtained by slowing the heating rate at which the dried slurry of powdered silicon rich alloy is fired. This slower heating rate causes the silicide compounds to remain molten for a shorter period of time and, in effect, shortens the time available for the molten material to "wet-out" or smooth out on the substrate 2 as compared to fusing parameters used in the past. For example, in prior fusing techniques employed, the heat up time in the critical temperature range between 2000° F. and 2680° F. was 25 minutes, resulting in a heating rate of 23° F. per minute. In accordance with the invention, the heat up time in the same temperature range (between 2000° F. and 2680° F.) is set as one (1) hour to provide an approximate heating rate of 11° F./minute and the resultant surface roughness of the fused silicide layer is approximately 160-180 micro-inches RMS. This increase in surface roughness increases the bonding or adherence of the ceramic layer to the silicide layer.

Another technique for increasing surface roughness of the silicide layer is to grit blast (using 54 mesh alumina or silicon carbide abrasive) the surface 2a of the refractory metal substrate 2 such as columbium alloy to yield an as-blasted or as-roughened surface roughness of about 200 micro-inches RMS or greater. The silicide layer fused on such a roughened substrate surface by conventional fusing techniques (i.e., not using the modified fusing technique of the preceding paragraph) will have a surface roughness of approximately 170-190 micro-inches RMS or greater.

Still another technique for increasing surface roughness of the silicide layer is to increase the thickness of the silicide layer. For example, silicide layers with 6 mil thickness exhibit surface roughness of about 180-200 micro-inches RMS as opposed to a surface roughness of about 100-140 micro-inches RMS for a 3 mil thick silicide layer, both layers being fused under the same conventional fusing techniques (i.e., not using the modified technique described above or substrate surface roughening also described above). Preferred thickness for the silicide layer for this aspect of the invention is about 5 mils to about 8 mils. For the other embodiments of the invention described hereinabove, preferred thickness for layer 4 is about 3 mils to about 6 mils.

Another technique also employed in accordance with the invention to promote and enhance adherence of the ceramic layer to the silicide layer involves a post-treatment of the ceramic coated article. In particular, the ceramic coated article is exposed to a high temperature oxidizing environment; e.g., 2500° F. for 1-2 hours or more in air. Since the plasma sprayed ceramic layer 6 is somewhat permeable to air, the silicide coating will oxidize at the silicide-ceramic interface to form a silica scale ($SiO_2$) that grows into crevices, pores and other interstices of the ceramic at and near their interface to fortify the bond between the layers.

Regardless of the technique employed to roughen the surface 4a of the silicide layer, enhanced adherence of the ceramic layer 6 thereto is obtained for higher roughness silicide surfaces 4a, especially in the range of about 160 to about 300 micro-inches RMS. An even more preferred range of surface roughness for layer 4 is about 200 to about 300 micro-inches RMS.

The refractory metal composite article of the invention finds special use as a hot section component in the gas turbine engine illustrated schematically in FIG. 2. It can be seen that the gas turbine engine includes an upstream compressor section 100, including compressor blades 100a and vanes 100b, that delivers compressed heated air to a combustor section 102 which may take various forms known to those skilled in the art where fuel and compressor discharge air are intermixed and ignited. The ignited hot gas flow from the compressor is delivered or passed through a turbine section 104 having turbine blades 104a and then is discharged out the downstream end of the engine, all as is well known. The engine includes an afterburner section 106 in which additional fuel is injected into the already hot ignited gases from the turbine section for thrust augmentation purposes In gas turbine engines of the type illustrated, silicide coated columbium alloy components have been used as downstream hot section components; e.g., as liners 107 in the afterburner nozzle 108. In the afterburner section, the design wall or liner temperature may range from 2000° F. to 2700° F. during operation of the engine.

As is known, a variety of metals and alloys are utilized in the various sections of the engine upstream of the afterburner section. These metals and alloys include aluminum, titanium, steels and of course nickel, cobalt and iron based superalloys Furthermore, a large variety of materials including metal alloys are used as coatings for wear, corrosion and erosion resistance, particularly in the hot turbine section, and as abradable seals.

As a result, there is a great potential for some of these other metals and materials as well as oxides and other compounds thereof to accidentally or inadvertently pass downstream in the gas flow of the engine and come in contact with the liner of the afterburner section. Since the liner made of silicide coated columbium alloy may be operating at 2000° F. to 2700° F. and since the principal constituent of the silicide coating is silicon, contact therewith at such high temperatures of any of the dissimilar metals or oxides thereof or other materials from upstream components can result in serious damage to the silicide due to chemical or metallurgical reaction therewith It is likely that any of the metals or alloys referred to hereinabove that are commonly used in the upstream sections of the engine, if in contact with the silicide coating on the refractory metal liner at surface temperatures of 2200° F. or greater for sufficient time, will alloy or react therewith to effect either eutectic formation or localized melting of the silicide, or at the very least, localized degradation of the silicide coating which may then fail prematurely.

A refractory metal afterburner liner coated in accordance with the invention will be quite beneficial in that the ceramic layer 6 adhering on the silicide or other intermetallic layer 4 will function as a barrier to chemical or metallurgical attack by metals or compounds thereof that may contact the ceramic layer when the liner is at temperatures of 2200° F. or greater in the afterburner. As mentioned hereinabove, the ceramic layer 6 is selected to be stable; i.e., substantially nonreactive, to these metals or compounds from upstream engine components. By coating the silicide layer 4 with the ceramic layer 6 in accordance with the invention, the potentially serious problem of reaction of the silicide coating with other materials of construction found in upstream sections of the engine and inadvertently brought in contact with the liner during engine operation can be minimized or avoided altogether. The ceramic layer 6 is also beneficial in that it functions as a thermal barrier on the silicide layer 4 and substrate 2 to reduce the temperature thereof and, in effect, allow the maximum operating temperature of the liner to be increased. This effect allows a higher gas discharge temperature to be used in the afterburner section or other sections of the engine. The ceramic layer 6 also functions to provide enhanced wear or erosion resistance to the hot gas flow in such engine applications.

The silicide layer 4 provides oxidation protection to the substrate This function is not adversely affected by ceramic layer 6 and, instead, ceramic layer 6 lowers the temperature of the silicide layer and substrate as a result of thermal barrier action and may concurrently also inhibit accessibility of oxygen to the surface of the silicide layer.

Of course, the refractory metal composite article of the invention may also find use as a component in other hot sections of the gas turbine engine illustrated.

As is apparent, in many service applications, the ceramic overlay coating can perform several functions. In an application in which a significant portion of the heat transferred to a coated refractory metal component is by radiation and there is the potential for heat to be extracted from the component by active or passive cooling methods, then it is feasible to have a ceramic layer 6 that would at the same time serve as (1) a barrier to prevent metallurgical alloying leading to melting, (2) as a thermal barrier coating to reduce the temperature at the surface of the silicide coating and of the basic refractory metal substrate and (3) as a highly reflective coating (low emittance, low absorptance) to aid in minimizing the temperature of the silicide thereby lengthening its life and reducing the temperature of the refractory substrate. In this example, if it is feasible to radiation cool the component from areas thereof opposite the heat source, then a ceramic coating or layer 6 in those areas could be selected that would serve as (1) a metallurgical barrier and (2) as a high emissivity coating to aid in rejecting heat and reducing the part temperature with the benefits noted above, e.g., see FIG. 3. A prime example of such a service application is in small restartable liquid rocket motor combustion chambers and nozzles. These are typically used as reaction control motors for missiles and spacecraft including orbiting satellites. They operate at the highest possible temperatures to maximize the fuel efficiency. Consequently, many are made of columbium alloys and are protected from oxidation by silicide coatings, primarily that described in aforementioned U.S. Pat. No. 3,540,863. Usually these nozzles are also radiation cooled. Therefore, the performance and/or life of such devices would be improved by overlaying the silicide coating 4 on the inner hot surfaces with a ceramic coating 6 that would have a low emittance and low thermal conductivity while simultaneously serving as a metallurgical reaction barrier.

In the case of the small liquid rocket motor, the ceramic coating on the inside hot surface could be yttria stabilized zirconia which also has a lower emittance than the silicide layer. However, the coating may be in turn overcoated with an alumina layer 14 which has a still lower emittance and has better erosion resistance, e.g., see FIG. 3 showing such a multiplex coating system. Both of these ceramic overlay coatings will serve simultaneously as metallurgical barrier coatings. It is desirable that the outer heat-radiating surface of such a radiation cooled component have a high radiation emissivity. Since the emissivity of the silicide coating in the oxidized condition is quite high, it would seem that no additional coating would be required. However, since these rockets are employed in the hard vacuum of space, there is little likelihood for oxidation of the silicide layer on outside radiating surface. Therefore, the silicide coating on the outside radiating surfaces will probably not be oxidized in service and thus will not have a desired stable high emissivity. Consequently, it would be beneficial to apply a stable high emissivity ceramic coating directly on the outside radiating surface of the silicide layer 4. This coating could be hafnia, hafnia-titania or yttria stabilized zirconia-titania, e.g., see FIG. 3 showing such a multiplex coating system.

While the invention has been described hereinabove with respect to applying a fused silicide layer to the refractory metal substrate, it will be apparent to those skilled in the art that techniques other than fusing may be employed. For example, the silicide or other intermetallic layer might be applied by pack cementation processes or other known processes wherein the intermetallic layer is formed in situ on the substrate to include an oxidation resistant intermetallic compound of the refractory metal.

To illustrate the invention in more detail, the following example is provided:

EXAMPLE

Four test specimens of the columbium alloy designated as Cb 752 (Cb-10% W-2.5% Zr) were prepared using 0.022 inch thick sheet material. The specimens were 3"×3" squares and contained small mounting holes to facilitate subsequent attachment to a test fixture.

The specimens were first coated with a fused silicide coating of the composition Si-20%Cr-20%Fe in a process utilizing the following steps:
1. Vapor degreasing parts in trichloroethylene.
2. Grit blast all surfaces with 120 mesh iron grit.
3. Make slurry consisting of powders in the proportions Si-20% Cr-20% Fe by weight and add sufficient nitrocellulose lacquer (Raffi & Swanson L-18 or equivalent) to result, when mechanically stirred, in a slurry with a viscosity of 100–200 centipoise. The powders all are 99%+ pure and are −325 mesh size.
4. Spray all surfaces of the specimens with the above slurry to result in an air dried coating measuring approximately 9 mils in thickness and having a unit weight of approximately 40 mg/cm$^2$. Air dry 4 hours.
5. Set parts on alumina or quartz pads in electrically heated, cold wall vacuum furnace chamber. Evacuate down to $10^{-4}$ torr.
6. Raise power to furnace but hold power level whenever pressure exceeds $10^{-3}$ torr. When temperature reaches approximately 2000° F. raise power to effect a linear rise in temperature of approximately 11° F./Minute so that in approximately 1 hour a temperature of about 2680° F. is achieved. Hold temperature at 2680° F. for 1 hour then turn off power to heating elements and let furnace cool. When furnace has cooled to 200°–400° F. backfill with inert gas.
7. Open furnace and remove parts. Perform required non-destructive testing and other quality checks.

Two of the above silicide coated columbium alloy test specimens were subsequently overcoated with a ceramic thermal barrier coating on one side as follows:
1. The parts were handled only with lint free cotton gloves after removal from vacuum furnace.
2. The parts were suitably fixtured in an exhaust hood to present the face to be coated directly towards the open end of the hood.
3. One specimen was coated with 0.015 inch thick and one specimen with 0.020 inch thick yttria stabilized zirconia coatings (Metco 202 NS, Composition 80% zirconia-20% yttria Metco Inc.) by the air plasma spray process using the following parameters:

| | |
|---|---|
| a. Gun | Metco 7M |
| b. Nozzle | Metco GH |
| c. Powder Port | Metco #2 |
| d. Primary Gas | Type Argon |
| | Pres. 100 PSI |
| | Flow 80 SCFM |
| e. Secondary Gas | Type Hydrogen |
| | Pres. 50 PSI |
| | Flow 15 SCFM |
| f. Arc Amps | 500 |
| Arc Volts | 64–70 |
| g. Spray Distance | 2½ Inches |
| h. Spray Rate | 6#/Hour |

4. Spraying is accomplished with sufficient passes and at such a traverse rate as to prevent the specimen from exceeding 500° F. during the spraying operation.

The effectiveness of the duplex coating was tested as follows:
1. Each duplex coated (DC) specimen was paired with a similar silicide coated specimen without a ceramic coating thereon.
2. Each pair was separately tested by attaching each specimen to an arm extending from an air cylinder actuated by a timer so that each specimen was alternately moved from an oxyacetylene torch flame to a cold air blast every five minutes. The torch was first adjusted while on the specimen without a ceramic coating so that a temperature of 3000° F. was reached on the front side (flame side) as measured with an optical pyrometer. At that point the timers were actuated. During the test the temperatures of the front side and back side were measured and recorded on each specimen during each cycle. The tests were continued for 7 five minute cycles. At that point one of the base line specimens (without the ceramic coating) exhibited a burn through and the other appeared to be very close to failure. The DC specimens were completely intact. The 0.015 inch thick DC specimens exhibited a backface temperature averaging 104° F. below the baseline specimen tested with it as a result of thermal barrier action of the ceramic layer. The 0.020 inch thick DC specimen displayed a backface temperature averaging 125° F. below its corresponding baseline specimen for the same reason.

While certain preferred embodiments of the invention have been described in detail hereinabove, those familiar with this art will recognize that various modifications and changes can be made therein for practicing the invention within the scope of the appended claims which are intended to include equivalents of such embodiments.

I claim:

1. A coated article comprising a columbium substrate, an oxidation resistant intermetallic silicide layer fused in situ to the substrate and including by a reaction therewith an oxidation resistant columbium silicide compound, and a ceramic layer adhered to the intermetallic silicide layer and stable in high temperature oxidizing environments and at the interface with the silicide layer, said intermetallic silicide layer having a surface roughness of at least about 160 micro-inches RMS to promote adherence of the ceramic layer thereon.

2. The coated article of claim 1 wherein the intermetallic silicide layer has a surface roughness of at least about 200 micro-inches RMS.

3. A coated article comprising a columbium substrate, an oxidation resistant, silicon-bearing intermetallic layer formed in-situ on the substrate and including by a reaction therewith an oxidation resistant, fused silicide of columbium, and a ceramic layer adhered to the intermetallic layer and stable in high temperature oxidizing environment and at the interface with the intermetallic layer, said intermetallic layer having a surface roughness of at least about 160 micro-inches RMS to promote adherence of the ceramic layer thereon.

4. The coated article of claim 3 wherein the intermetallic layer has a surface roughness of at least about 200 micro-inches RMS.

* * * * *

UNITED STATES PATENT AND TRADEMARK OFFICE
CERTIFICATE OF CORRECTION

PATENT NO. : 4,889,776

DATED : December 26, 1989

INVENTOR(S) : Seymour Priceman

It is certified that error appears in the above-identified patent and that said Letters Patent is hereby corrected as shown below:

```
Column 5, line 62, change "th" to --the--.
Column 6, line 12, change "o" to --on--.
Column 7, line 54, after "purposes" insert --.--.
Column 7, line 65, after "superalloys" insert --.--.
Column 8, line 13, after "therewith" insert --.--.
Column 8, line 49, after "substrate" insert --.--.
```

Signed and Sealed this

Twenty-seventh Day of November, 1990

Attest:

HARRY F. MANBECK, JR.

*Attesting Officer*  *Commissioner of Patents and Trademarks*